US012613151B2

(12) United States Patent
Fu et al.

(10) Patent No.: US 12,613,151 B2
(45) Date of Patent: Apr. 28, 2026

(54) HIGH SENSITIVITY, WIDE RANGE AND ANY SIZE PRINTED PRESSURE DISTRIBUTION MONITORING ULTRATHIN FLEXIBLE MAT SYSTEM

(71) Applicant: Nano and Advanced Materials Institute Limited, Hong Kong (HK)

(72) Inventors: Li Fu, Hong Kong (HK); Tao Xu, Hong Kong (HK); Yam Chong, Hong Kong (HK)

(73) Assignee: Nano and Advanced Materials Institute Limited, Hong Kong (HK)

( * ) Notice: Subject to any disclaimer, the term of this patent is extended or adjusted under 35 U.S.C. 154(b) by 290 days.

(21) Appl. No.: 18/426,301

(22) Filed: Jan. 29, 2024

(65) Prior Publication Data

US 2025/0244183 A1    Jul. 31, 2025

(51) Int. Cl.
G01L 1/18        (2006.01)
G01L 1/20        (2006.01)

(52) U.S. Cl.
CPC ................. G01L 1/18 (2013.01); G01L 1/205 (2013.01)

(58) Field of Classification Search
None
See application file for complete search history.

(56) References Cited

U.S. PATENT DOCUMENTS

| | | | |
|---|---|---|---|
| 5,033,291 A | 7/1991 | Podoloff et al. | |
| 5,400,662 A | 3/1995 | Tamori | |
| 5,989,700 A | 11/1999 | Krivopal | |
| 6,216,545 B1 | 4/2001 | Taylor | |
| 6,370,965 B1 | 4/2002 | Knapp | |
| 7,021,158 B2 | 4/2006 | Shimizu et al. | |
| 8,661,917 B2 | 3/2014 | Jheng et al. | |
| 8,672,842 B2 * | 3/2014 | Kenalty | A61B 5/0015 600/587 |

(Continued)

FOREIGN PATENT DOCUMENTS

| | | |
|---|---|---|
| CN | 101201277 A | 6/2008 |
| CN | 109238519 A | 1/2019 |

(Continued)

*Primary Examiner* — Peter J Macchiarolo
*Assistant Examiner* — Jermaine L Jenkins
(74) *Attorney, Agent, or Firm* — IDEA Intellectual Limited; Sam T. Yip

(57)        ABSTRACT

A pressure distribution monitoring flexible planar mat system with a wide pressure measuring range. The flexible planar mat includes a first electrode layer and a first composite piezoelectric-dielectric layer with a second composite piezoelectric-dielectric layer facing the first layer and a second electrode layer. Each of the first and second composite piezoelectric-dielectric layers includes an elastomeric matrix with conductive and dielectric particles embedded therein. The relative size of the conductive particles and the dielectric particles creates a micro-rough interface between these layers and the electrode layers resulting in a range of contact areas, permitting detection between 0 and 3000 kPa. The flexible planar mat system further includes a data collector that collects a pressure signal from the mat. A pressure distribution data processor receives and calculates data from the data collector and creates a two-dimensional pressure map from the flexible planar mat.

18 Claims, 10 Drawing Sheets

(56)  References Cited

U.S. PATENT DOCUMENTS

| | | | |
|---|---|---|---|
| 8,966,997 B2 * | 3/2015 | Taylor | G01L 5/00 |
| | | | 73/862.041 |
| 10,745,512 B2 | 8/2020 | Xu et al. | |
| 11,068,060 B2 * | 7/2021 | Wong | G06F 3/044 |
| 11,740,143 B2 | 8/2023 | Fu et al. | |
| 11,860,004 B2 * | 1/2024 | Salter | G01D 5/2405 |
| 2019/0219460 A1 * | 7/2019 | Cho | G01L 1/18 |
| 2022/0252475 A1 | 8/2022 | Hussein | |
| 2022/0326099 A1 | 10/2022 | Chong et al. | |

FOREIGN PATENT DOCUMENTS

| | | | |
|---|---|---|---|
| CN | 112835468 A | 5/2021 |
| CN | 113405448 B | 7/2022 |
| EP | 0871681 B1 | 5/2000 |
| EP | 3726191 A1 | 10/2020 |
| WO | 2013022497 A2 | 2/2013 |
| WO | 2013105028 A2 | 7/2013 |
| WO | 2017114978 A1 | 7/2017 |

* cited by examiner

Pressure-Sensing
Mat 100

Data collector 200

Pressure Distribution
Data Processor 300

System 10

120
130
140
145
135
125

(i)                                    (ii)                                   (iii)

Screen printed pressure sensor array mat

Sensing area

Data collector

Measuring software system

50x36 pressure sensing mat with protection sleeve and data collector

Weights

60x70cm            40x60cm
*Pixel: 130x110*      *100x90*

Shoes #1          Shoes #2          Shoes #3

HIGH SENSITIVITY, WIDE RANGE AND ANY SIZE PRINTED PRESSURE DISTRIBUTION MONITORING ULTRATHIN FLEXIBLE MAT SYSTEM

FIELD OF THE INVENTION

The present invention relates to the field of pressure distribution monitoring sensors, and more particularly, to ultrathin, flexible, highly sensitive and pressure distribution sensors for measuring the dynamic force and pressure distribution between opposing objects over a wide range of pressures.

BACKGROUND

Traditional pressure sensors are rigid, bulky and can only be used for single point pressure monitoring. Thus, they are not suitable for applications that require thin and flexible form factors or that require pressure mapping capabilities. Pressure mapping depicts a pressure distribution caused by interaction of two objects under multiple points of contact. Pressure mapping is widely used to determine the pressure distribution between the human body and a mattress, a foot and insole, a head and pillow, etc. Pressure distribution from pressure mapping can be also widely used for scientific analysis of sports, pressure uniformity tuning of pressure-based machines, games and music mats, flatness checking of products, design assistance of athletic equipment, and electronic skin.

However, most pressure sensors are only sensitive in a very narrow pressure range, limiting their practical applications. For example, some sensors can only test pressures below 50 kPa, while other sensors can only sense pressures above 50 kPa. Typically, such higher-level pressure sensors are not sensitive to pressure below 50 kpa, and are easily saturated at relative higher pressures. Thus, to meet the test requirements for sensing a wide pressure range, conventional testing requires replacing pressure sensors having different pressure sensor level specifications; however, such techniques cannot provide information over a wide range to measure a continuous and dynamically-changing pressure scenario.

CN 112835468 relates to a sensor measuring touch in a multitouch system. The sensor uses conductive first and second particles in a dielectric elastic layer. The CN document requires that the first particles and the second particles be vertically arranged coaxially with a gap in the middle; the upper end surface of the first particle is at the same height as the upper side of the elastic dielectric layer; the lower end surface of the second particle is at the same height as the lower end surface of the elastic dielectric body. Under the action of force (for example, the user presses the pressure receiving plate with a finger), some of the first particles and the second particles are connected to each other, and a closed circuit is formed between the first electrode and the second electrode, and a certain resistance can be detected. While the CN document provides touch sensing, it does not sense over a wide pressure range and requires precise particle spacings and orientations. In addition, the production process is very complicated.

U.S. Pat. No. 11,740,143 describes a textile-based pressure sensor array used to determine the pressure distribution of soft and curved contact surfaces such as cushions and automobile seats. However, this type of textile-based pressure sensor array also has its inherent disadvantages; for example, the irregular surface of fabric affects the accuracy and consistency of printed circuits; deformations such as stretching and twisting of the fabric will change its impedance and affect test results along with relatively poor fastness of printed electrode materials on fabric surfaces. Additionally, fabric-based sensors typically have a high crosstalk effect, low sensitivity, a small measuring range, and complex production processes. Thus, there is a need in the art for improved pressure sensor arrays for pressure distribution mapping systems that have high sensitivity and accuracy, excellent consistency and durability, wide measurement range, and facile production processes. The present invention addresses this need.

SUMMARY OF THE INVENTION

The present invention provides a pressure distribution monitoring flexible planar mat system that has a wide range of pressure measuring capabilities. The flexible planar mat includes a first electrode layer and a first composite piezoelectric-dielectric layer. A second composite piezoelectric-dielectric layer faces the first composite piezoelectric-dielectric layer with a second electrode layer positioned beneath the second composite piezoelectric-dielectric layer. Each of the first and second composite piezoelectric-dielectric layers includes an elastomeric matrix. Embedded in the elastomeric matrix is a first set of conductive particles. The first set of conductive particles are selected from one or more of carbon nanotubes, graphite particles, carbon fibers, carbon spheres, activated carbon, acetylene black, semiconductors, metals, or graphene in an amount of approximately 2 to 10 wt. %. Also embedded in the elastomeric matrix are dielectric particles selected from one or more of silica, zirconium oxide, alumina, boron nitride, aluminum nitride, silicon nitride, zinc oxide, silicon carbide, titanium dioxide, or calcium carbonate in an amount of approximately 1 to 5 wt. % and a particle size of approximately 0.5-1 micron.

The flexible planar mat has a total thickness less than approximately 0.30 mm. The relative size of the conductive particles and the dielectric particles is configured such that an interface between a composite piezoelectric-dielectric layer and an electrode layer has a micro-rough surface such that low pressure loads of 50 kPa or less generate a contact area of 0-10 percent of a layer surface area and high pressure loads of 50-3000 kPa generate a contact area of at least 10-100 percent of a layer surface area such that a total pressure detection range of the pressure distribution monitoring ultrathin flexible planar mat system is 0-3000 kPa.

Optionally, the flexible planar mat system further includes a data collector that collects a pressure signal from the flexible planar mat. A pressure distribution data processor for receiving and calculating data from the data collector and creating a two-dimensional pressure map from the flexible planar mat.

In a further aspect, the first and second electrode layers are each formed on a flexible substrate having a thickness of 50-100 micron.

In a further aspect, the flexible substrate is selected from polyethylene terephthalate or polyimide.

In a further aspect, the first and second electrode layers include screen printed lines including electrode conductive particles.

In a further aspect, the electrode conductive particles are selected from one or more of silver, copper, or aluminum.

In a further aspect, the data collector includes an electrical resistance meter for measuring and recording electrical resistance of each pressure sensor in the mat under different pressure, a signal amplifier, an analog-to-digital converter and a data transmitter.

In a further aspect, the pressure distribution data processor provides a two-dimensional pressure distribution pattern of a static or dynamic applied pressure.

In a further aspect, the composite piezoelectric-dielectric layers include a second set of conductive particles, different from the first set of conductive particles used in electrode layers.

In a further aspect, the second set of conductive particles may be selected from one or more of carbon nanotubes, graphite particles, carbon fibers, carbon spheres, activated carbon, acetylene black, semiconductors, metals, or graphene.

In a further aspect, the elastomeric materials include nitrile-based rubbers (e.g., hydroxyl-terminal nitrile rubber), silicone-based polymers, butyl-based rubbers, polyurethane elastomers bromobutyl rubber, chlorobutyl rubber, polyurethane, natural rubber, polyisoprene rubber, polybutadiene rubber, ethylene-propylene rubber, polysulfide, ethylene-propylene-diene rubber, poly(styrene-co-butadiene) rubber, poly(isoprene-co-butadiene) rubber, styrene-isoprene-butadiene rubber.

BRIEF DESCRIPTION OF THE DRAWINGS

(FIG. 3A) Cross-section of sensor array in the mat with upper and lower electrodes and piezoresistive dielectric dual interlayers; (FIG. 3B) point-to-point contact mode of sensor array under lower pressure; (FIG. 3C) area-to-area contact mode and compression deformation of the piezoresistive dielectric bulk under higher pressure.

DETAILED DESCRIPTION

Figures 1, 2A:
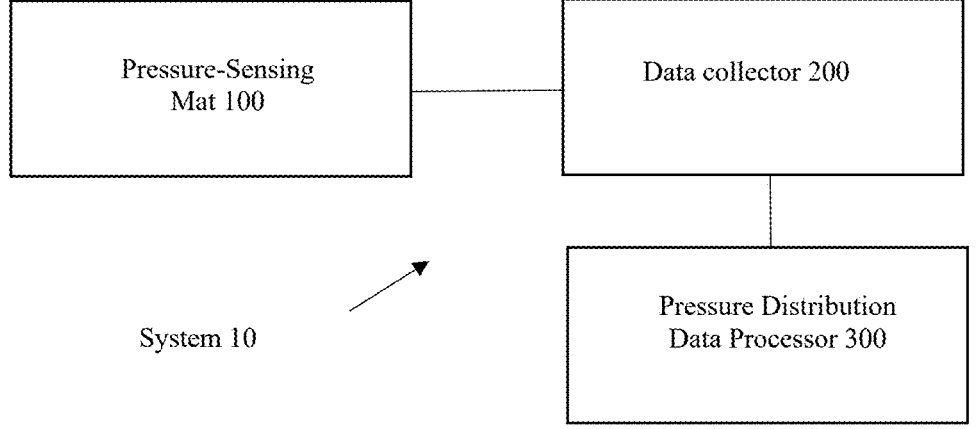
FIG. 1 depicts a pressure mapping system 10 according to an embodiment.
FIG. 2A depicts a layer structure for a pressure sensor mat for the pressure mapping system of FIG. 1.

Turning to the drawings in detail, FIG. 1 depicts a pressure mapping system 10 that includes a pressure-sensing ultrathin mat 100 that includes a printable pressure sensor array 110, a data collector 200, and a pressure distribution data processor 300.

Figure 2B:
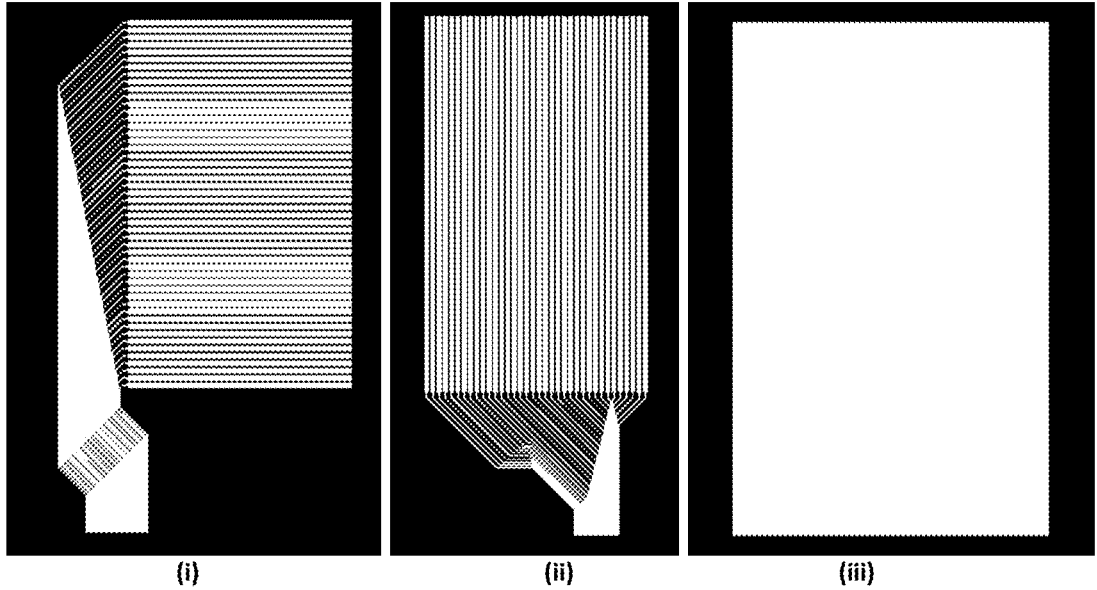
FIG. 2B depicts a screen-printing pattern for various layers in FIG. 2A including (i) an electrode layer upper face; (ii) an electrode layer lower face; (iii) piezoresistive dielectric dual interlayers.

FIG. 2A schematically depicts the pressure sensing mat 100 in further detail. Printed pressure sensor array 110 includes two flexible film substrates 120, 125 with printed silver electrodes 130, 135 and piezoresistive dielectric intermediate layers 140 and 145. Using inexpensive printing techniques such as screen printing, the pressure-sensing mat can be fabricated in a wide variety of sizes depending upon the required sensing application. FIG. 2B depicts an example of an electrode pattern for layers 130 and 135. The electrode pattern typically uses a conductive paste having a particle size on the order of approximately 0.5 micron to 1.0 micron, optionally deposited by printing. The formed pattern of conductor lines creates a micro-rough surface on the flexible film substrates 120 and 125

Figures 3A, 3B, 3C:
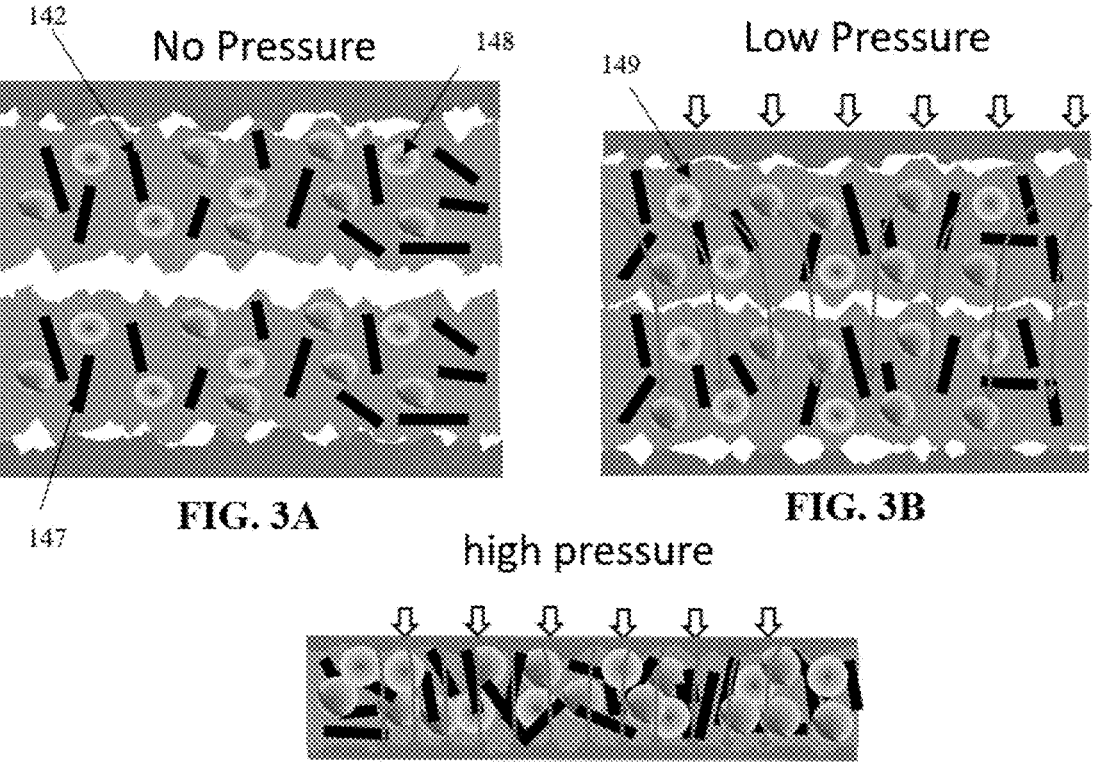
FIGS. 3A-3C schematically depicts sensing with increasing pressure in the pressure sensor mat.

Piezoresistive dielectric intermediate layers 140 and 145 include a unique combination of conductive and dielectric particles in a flexible polymeric binder phase that enable the pressure sensing mat to accurately sense pressures in both the low-pressure range of under 50 kPa as well as the high-pressure range of over 50 kPa, even up to 3000 kPa. The sensing mechanism of the pressure sensor array formed by the combination of conductive and dielectric particles is schematically depicted in FIGS. 3A-3C. The micro-rough electrode layers 130 and 135 on substrates 120 and 125 respectively contacts piezoresistive dielectric intermediate layers 140 and 145. This micro-rough condition is depicted in FIG. 3A. At a low applied external pressure (for example, below 50 kPa), contact between conductive particles 142 and 147 is a point-to-point contact, making the overall system sensitive to extremely low applied pressures. Under a larger applied pressure (for example, a pressure above 50 kPa) the gaps between the peaks and valleys, supported by microparticles 148, of the rough surface are compressed/flattened. As a result, the contact mode changes to an area-to-area contact mode. As pressure increases, the layer combination is further compressed and deformed. However, due to the presence of micro-dielectric particle additives, the structural integrity of the system is sufficiently maintained such that the detection limit of the system is increased to a higher pressure level without overloading the pressure sensor array structure.

Typically, the micro-rough surfaces are configured such that low pressure loads of 50 kPa or less generate a contact area on the order of 0-10 percent of a layer surface area while high pressure loads of 50-3000 kPa generate a contact area of approximately 10-100 percent of a layer surface area such that a total pressure detection range of the pressure distribution monitoring ultrathin flexible planar mat system is 0-3000 kPa.

Layers 140 and 145 are particularly designed in order to provide this unique multimode contact structure that enables the wide pressure detection range. A screen printable piezoresistive dielectric composition is provided to create these layers. The matrix 149 of this composition provides a partially elastomeric structure, creating a resilient layer. Embedded in the elastomeric matrix are conductive particles 142 and 147 which, under an applied pressure, will create the conductive pathway between layers 140 and 145 and the electrode matrices 130, 135. Insulating/dielectric microparticles 148 contribute structural support and prevent premature compression/flattening so that the system is not overloaded at intermediate pressures. That is, due to the presence of particles 148, a larger force is required to reach the condition depicted in FIG. 3C. Consequently, a larger pressure range is achievable in the pressure mapping system 10.

The matrix 149 may be selected from a wide variety of polymeric materials. In particular, elastomers such as rubbers may be selected. However, mixtures of elastomeric polymers and non-elastomeric based polymeric materials may be used. Examples of suitable elastomeric materials include nitrile-based rubbers (e.g., hydroxyl-terminal nitrile rubber), silicone-based polymers, butyl-based rubbers, polyurethane elastomers bromobutyl rubber, chlorobutyl rubber, polyurethane, natural rubber, polyisoprene rubber, polybutadiene rubber, ethylene-propylene rubber, polysulfide, ethylene-propylene-diene rubber, poly(styrene-co-butadiene) rubber, poly(isoprene-co-butadiene) rubber, styrene-isoprene-butadiene rubber. These elastomers are optionally be mixed with thermoplastic or thermosetting polymers such as phenoxy resin, poly(methyl methacrylate), cellulose acetobutyrate, polyvinyl chloride propane-based polymers, polycarbonate, polyvinyl chloride, polyester, polyacrylate, butyral resin, polyamide, melamine resin, phenolic resin, and phenoxy resin.

For solvent-based screen printing, these materials are suspended in one or more solvents such as polyvinyl acetate, 2-(methoxy) ethanol, 2-butoxyethanol, 2(isoamyloxy) ethanol, 2(hexyloxy) ethanol, diethylene glycol, diethylene glycol monomethyl ether, diethylene glycol monoethyl ether, diethylene glycol monobutyl ether, triethylene glycol, triethylene glycol monomethyl ether, liquid polyethylene glycol, 1-methoxy-2-propanol, 1-ethoxy-2-propanol, dipropylene glycol, dipropylene glycol monomethyl ether, dipropylene glycol monoethyl ether, low molecular weight polypropylene glycol, aniline, ethylene glycol, propylene glycol, propylene glycol monomethyl ether acetate, ethyl acetate, isopropyl acetate, methyl ethyl ketone, dimethyl formamide, dimethyl sulfoxide and N-methylpyrrolidone, 2-butoxyethyl acetate, diglycidyl ether, phenyl glycidyl ether, cyclohexanediol diglycidyl ether, resorcinol diglycidyl ether, o-tolyl glycidyl ether, trimethylol triglycidyl ether, glyceryl ether, formamide, chlorobenzene, o-xylene, diacetone alcohol, butyl acetate, dimethylformamide, diphenyl ether.

The conductive particles 142, 147 may be selected based on a desired pressure range/sensitivity and thus can combine particles having different conductivities or a single type of particles with a single conductivity. Examples of particles include carbon nanotubes, graphite, graphene, carbon black, carbon fiber, carbon spheres, activated carbon, acetylene black, metals such as copper, aluminum, silver, or semiconductors, such as silicon, germanium, gallium arsenide, indium phosphide, gallium nitride, zinc oxide, aluminum nitride, silicon carbide, etc. For metals, nanowires may be used or nanoparticles. At least one set of particles should have a conductivity in a range from $10\text{-}10^3$ mS/cm while a second set of particles with higher conductivity may have conductivity in a range from $10^4\text{-}10^8$ mS/cm. In one embodiment, carbon nanotubes having, among these, multiwalled carbon nanotubes with a diameter of approximately 5-15 nm and a length of approximately 2-10 micron. By creating a custom-designed particle mixture with a particular selected conductivity, the pressure-sensing mat can be tailored to specific applications for a sensitive pressure response within a particular range. Typically, particle sizes range from 2 nm-20 micron while different particle shapes such as spherical, flakes, rods, and cubes may be used.

The structural/dielectric particles 148 may be ceramic or glass particles that have conductivities on the order of $10^{-22}\text{-}10^{-5}$ mS/cm and size ranges from 0.5-1 micron. Exemplary ceramic/glass particles include $SiO_2$, $ZrO_2$, alumina, boron nitride, aluminum nitride, silicon nitride, zinc oxide, silicon carbide, titanium dioxide, calcium oxide, magnesium oxide, barium oxide, calcium carbonate particles may be used. In general, the particle loading of the elastomeric matrix contributes to the micro roughness on the dielectric layer surface 140, 145 after curing. This micro-roughness in the surface of dielectric layers 140, 145, may be expressed as peaks and valleys that extend to a height/depth of +/− approximately 10-30% of a mean surface height across the layer surfaces.

Figure 10:
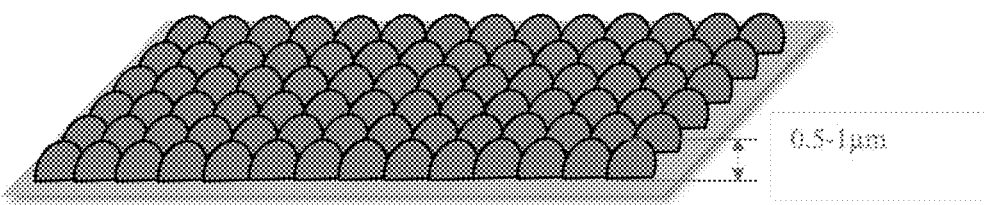
FIG. 10 depicts micro-roughness from a screen-printed conductive line.

Particle loads may be selected depending upon a desired application. For a pressure detection range of 0-3000 kPa, the particles 142 and 147 range from 1 to 10 percent by weight of layers 140 and 145. The structural particles 148 range from 1 to 5 percent by weight of layers 140 and 145. For a higher pressure range (that is, the upper end of the pressure range), fewer conductive particles and more structural particles are used while for a more sensitive mat, more conductive particles and fewer structural particles are used. Conductive electrode layers 130, 135 can take the form of a first set of parallel lines in layer 130 with another set of parallel lines 90 degrees from the first set of lines in layer 135 as seen in FIG. 2B. To create the micro-rough electrode lines, conductive electrode particles having a size on the order of 0.5-1 micron are embedded in a matrix to form a conductive paste. Conductive electrode particles such as silver, copper, aluminum, and mixtures thereof may be used in layers 130, 135. Following drying, the projections formed by each line create a micro-rough surface as seen in FIG. 10. As seen in FIG. 10, the micro-roughness caused by the particles may range from 0.5 to 1 micron, since this is the particle size of the particles used in the conductive electrode paste. Note that this roughness will change when the selected particle size changes. Further, if any heating is used in order to melt or partially melt or fuse the particles, the roughness will be smaller than the particle size.

In another aspect, the present invention provides a facile method for fabricating the ultrathin pressure sensing mat of pressure sensing system 10. Initially, a conductive electrode paste is printed on the surface of a flexible film type substrate to form layers 130, 135. In one aspect, the substrates for layers 130, 135 may be selected from conventional flexible electronics substrates such as polyethylene terephthalate (PET) or polyimide (PI) film substrates to form layers 130, 135.

The piezoresistive dielectric composition may be coated directly onto the conductive electrode layer via screen printing method. The combination of layers 130, 135 and 140, 145 are laminated together in a face-to-face orientation to obtain a sandwich pressure sensor mat as seen in FIG. 2A. Care is taken to ensure that the directions of electrode layer 130 on upper portion and electrode layer 135 on the lower portion are row and column respectively. Individual pressure sensors are formed by the intersection between a row electrically-conductive path and a column electrically-conductive path along with the portion of the piezoresistive layer positioned in the region the intersection. The thickness of the as-prepared pressure sensing mat may range from approximately 0.10-0.22 mm although other thickness ranges are possible depending upon the application and its desire pressure-sensing range.

The pressure mapping system 10 includes data collector 200. Data collector 200 includes an electrical resistance meter for measuring and recording an electrical resistance of each pressure sensor in the mat under different pressures, a signal amplifier, an analog-to-digital converter, and a data transmitter. Data collector scans and collects the dynamic resistance data of each pressure sensor in the mat, transmits the collected data measured from the pressure sensor array to an analog to digital converter and to the data transmitter. Pressure distribution data processor 300 receives data from the data transmitter of data collector 200 and can dynamically display recording pressure distribution of objects interacting with pressure-sensing mat 100 after calculation. In particular, a graphical user interface may be provided that displays the pressure distribution of the object being measured over the course of time. Static images may be stored as conventional image format files (for example, JPEG formats for static images, MPEG for moving images) or original pressure data format (for example .csv format). Colors can visually represent the pressure distributions in a color bar (for example, see FIG. 8) while a two-dimensional display of the pressure distribution provides a graphic representation. These two-dimensional images collected over time show the dynamic change in pressure on the contact surface.

The following examples show non-limiting embodiments of the present invention for particular applications; however, other embodiments such as those described above, may also be formed.

EXAMPLES

Example 1:50×36 Pressure Sensor Array Mat

A 50× 36 pressure sensor array mat is designed including a silver electrode paste-based upper set of conductive lines, silver electrode lower face conductive lines and piezoresistive dielectric dual interlayers as shown in FIG. 2A. A screen-printing process was used to fabricate the pressure sensor array mat. The printing configuration is shown in FIG. 2. 50 silver conductor paste electrodes using the silver conductive paste described in U.S. Pat. No. 10,745,512 (the disclosure of which is incorporated herein by reference) were formed with a 3 mm electrode width and a 2 mm electrode interval on the upper face of a polyimide film substrate with 0.1 mm in thickness, curing under 120° C. for 1 hour. After the electrode layers dry, a piezoresistive dielectric composition is screen-printed onto the electrode layers on the substrate, followed by curing under 120° C. for 1 hour again. The thickness of lower layers 130/140 is 0.11 mm. The composition of layers 140, 145 contains phenoxy/ 2-butoxyethyl acetate solution with carbon nanotubes (particles 142, 147), and a liquid rubber (e.g., hydroxyl-terminal nitrile rubber)/2-butoxyethyl acetate solution. Micro-$SiO_2$ and $ZrO_2$ particles are used as particles 148.

Similarly, a lower layer is formed having a thickness of 0.05-0.11 mm using the same process as that used to form the upper layer. The upper and lower layers were laminated together using an adhesive along the perimeter while ensuring the directions of electrodes on upper and lower substrates are row and column respectively. Individual pressure sensors having dimensions of approximately 3 mm×3 mm are formed by the intersection between the row electrically-conductive path and the column electrically-conductive path along with the portion of the piezoresistive layer positioned at the intersection. The 50×36 flexible pressure sensor array mat with a thickness of 0.10-0.22 mm was obtained for testing in system 10.

In Example 1, the piezoresistive dielectric composition is composed of 2-10 wt. % carbon nanotubes, 70-90 wt. % of 30 wt. % phenoxy resin/2-butoxyethyl acetate solution, 5-20 wt. % of 48 wt. % liquid rubber (e.g., hydroxyl-terminal nitrile rubber/2-butoxyethyl acetate solution), 1-5 wt. % micro-$SiO_2$ and —$ZrO_2$ particles, and 0.2-0.6 wt. % leveling agent. This piezoresistive dielectric composition is a fluid slurry with the viscosity of 8,000-11,000 cps.

Figure 4:
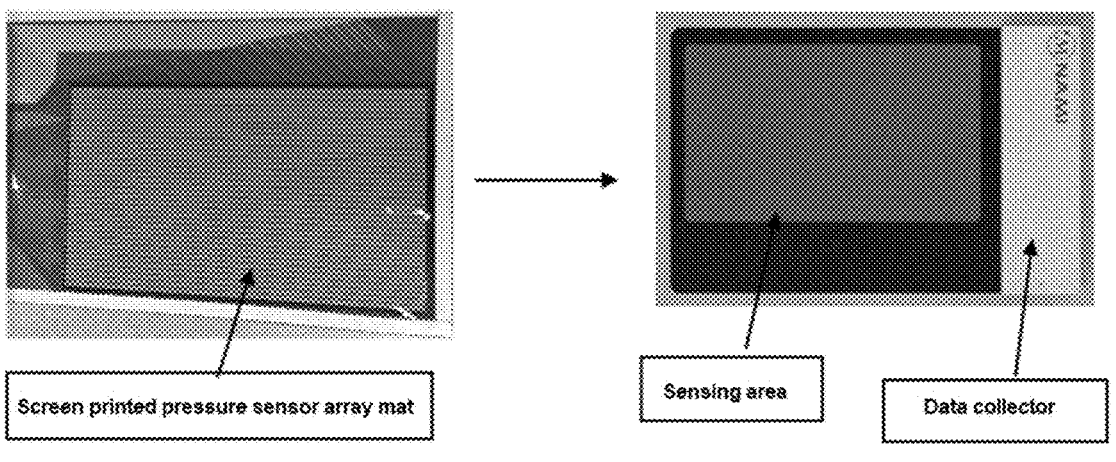
FIG. 4 shows a formed 50×36 pressure sensor mat.
Figure 6:
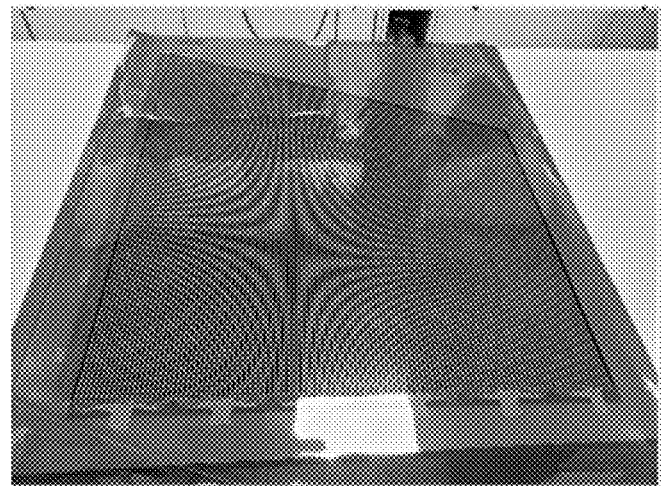
FIG. 6 depicts other sizes of pressure sensor mat configurations.
Figure 6:
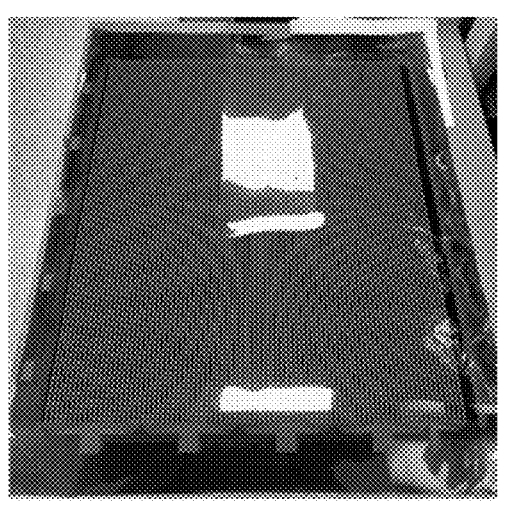

In further detail, a piezoresistive dielectric composition is prepared as follows: 30 wt. % phenoxy resin is dissolved in 2-butoxyethyl acetate to create solution A; 48 wt. % rubber was dissolved in another container of 2-butoxyethyl acetate to create solution B. The two solutions are mixed (A:B=80 wt. %:80 wt. %) by stirring, and 2 wt. % carbon nanotubes, 1 wt. % micro-$SiO_2$ and $ZrO_2$ particles, and 0.3% leveling agent are then added into the previous mixture and dispersed under vigorous stirring. A black fluid slurry is finally obtained for printing. The formed pressure sensor mat is depicted in FIG. 4, while other sizes are shown in FIG. 6.

Example 2: Pressure Sensor System

Figure 5:
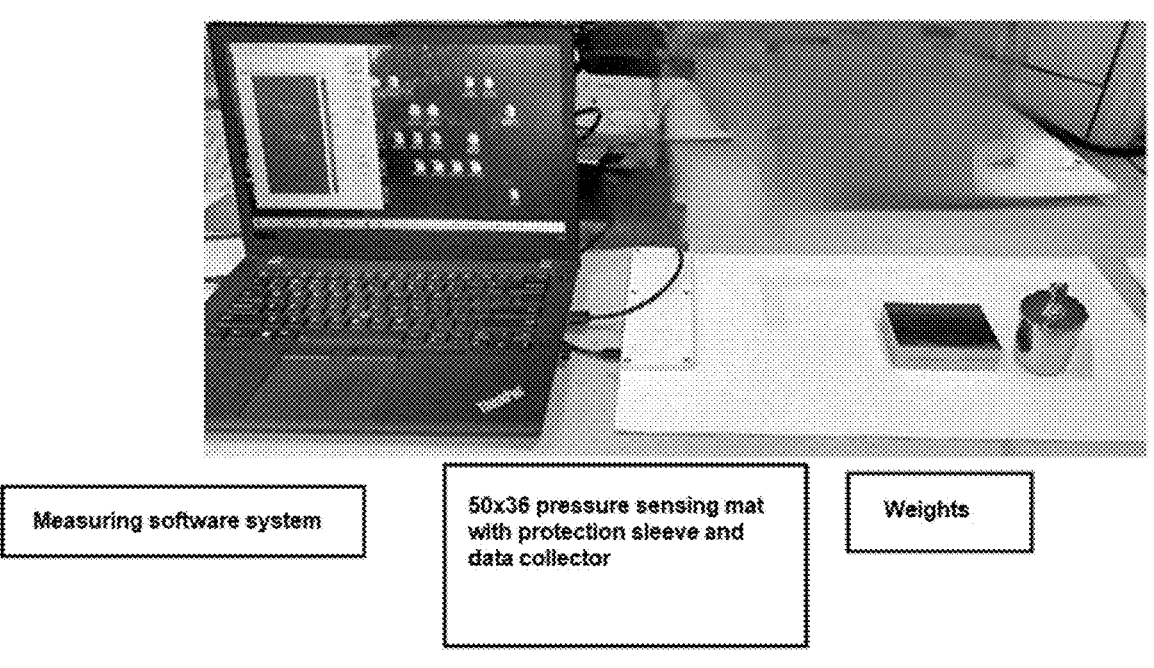
FIG. 5 shows an experimental pressure distribution monitoring system assembled with the pressure sensing mat, data collector, and pressure distribution data processor.

The 50×36 pressure sensor array mat of Example 1 is assembled with a data collector (FIG. 4) and coupled to the data processor 300 by a USB port to form the pressure distribution monitoring system 10 of FIG. 5 (FIG. 5). The system was used to measure a dynamic pressure distribution on a surface of mat 10 which is a 2-D high resolution color image on a display graphical user interface. Initially, the weights depicted in FIG. 5 were used to create a known pressure distribution for testing the accuracy and range of the mat of Example 1.

Figure 7A:
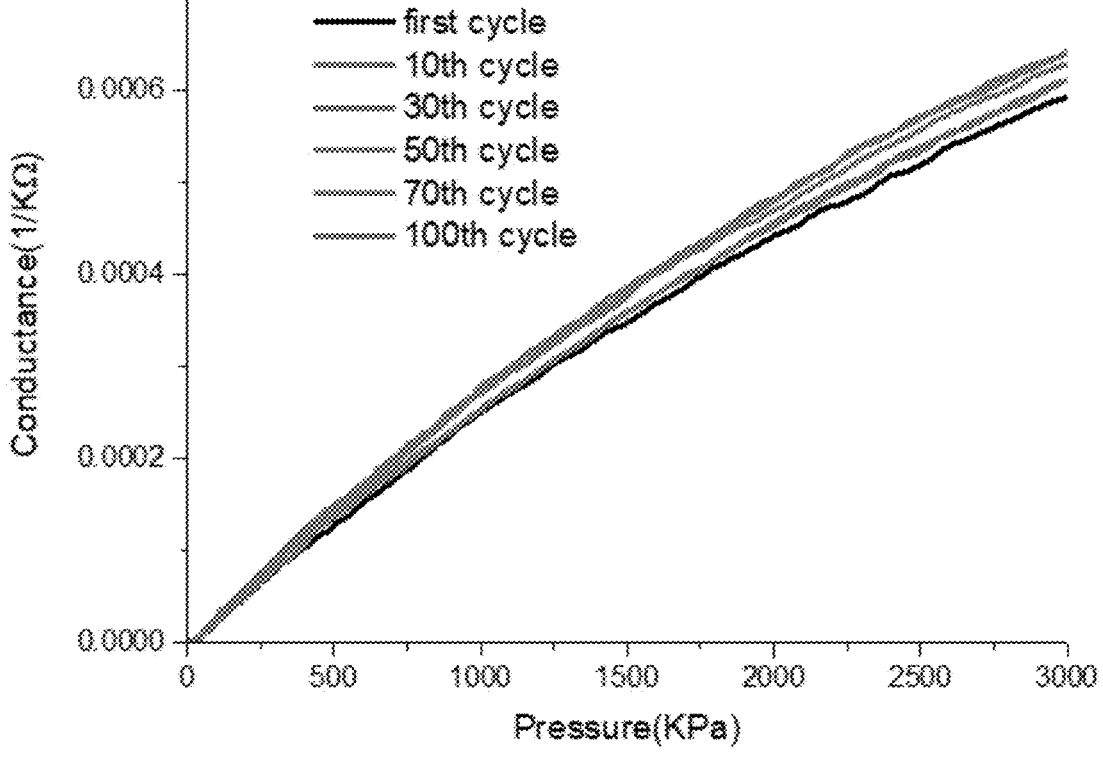
FIG. 7A shows the correlation of conductivity and pressure on the individual pressure sensor in the pressure sensing monitoring mat.

FIG. 7A depicts test result of the correlation of conductivity and pressure on the individual pressure sensors in the mat. The results show that the linear sensing range of pressure mat is 0-3000 kPa.

Figure 7B:
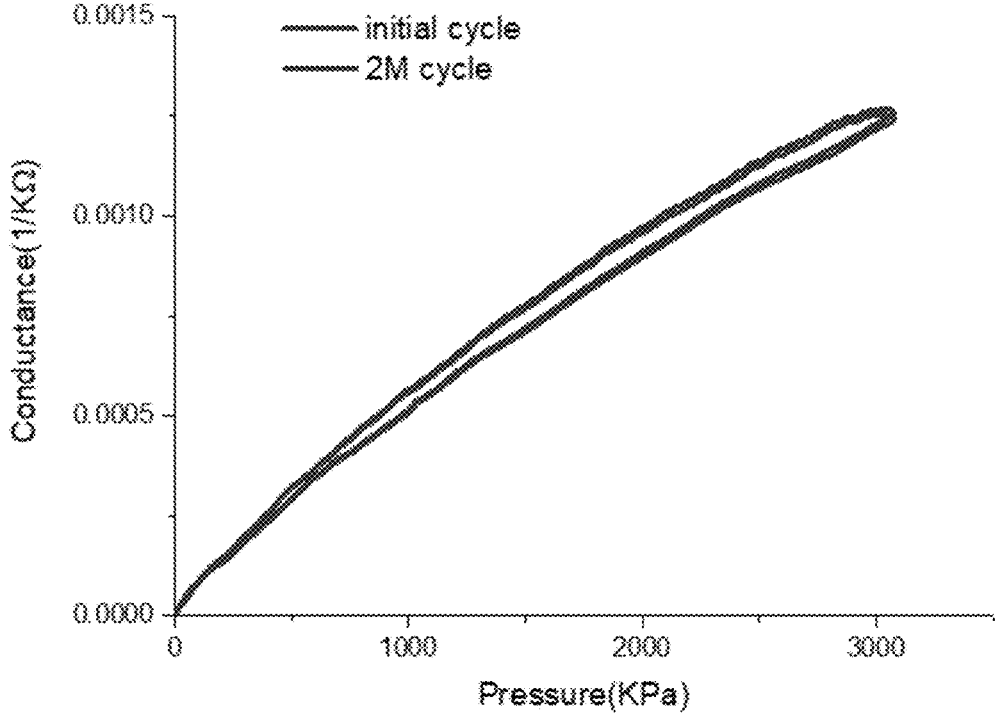
FIG. 7B is a durability test of pressure sensor array in the pressure sensing monitoring mat.

FIG. 7B demonstrates the durability of the pressure sensor array 2,000,000 times of repeat actuations achieves less than 10% variation from the initial pressure measurements with a sensitivity greater than 0.01 $kPa^{-1}$.

Example 3: Mapping Results

Figure 8:
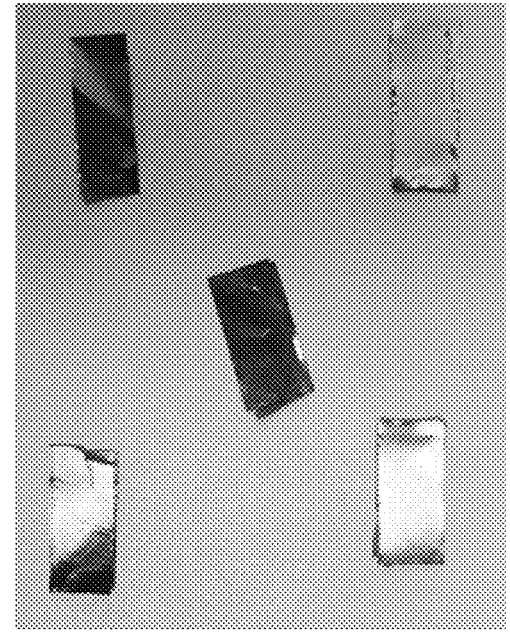
FIG. 8 shows a graphical pressure distribution mapping with 2-D image output at the condition of lower pressure on the mat.
Figure 8:
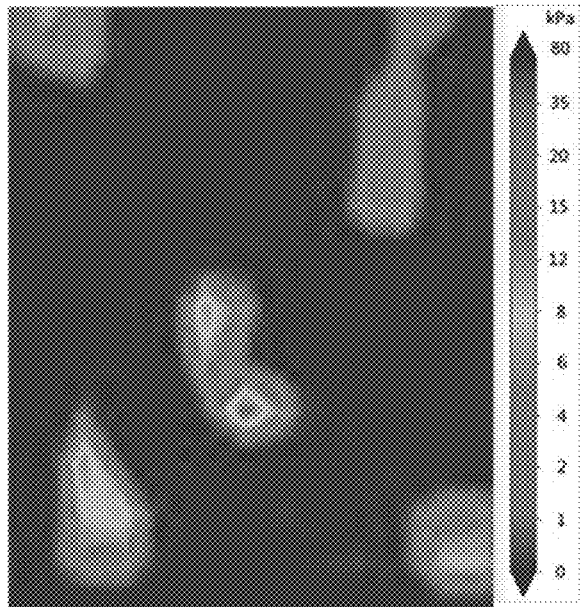

FIG. 8 depicts a pressure distribution mapping 2-D image output of the pressure sensing mat under low pressure conditions. When the four depicted light weights (10 g-200 g) were placed on the pressure sensing mat, a clear 2-D pressure distribution color image is output. Note that the image also clearly demonstrates the different surface flatness of each weight. Importantly, this type of pressure-sensing mat may be used to measure surface flatness of manufactured products, for example, batteries such as coin cells which require a flat surface in order to make proper electrical contact with a device.

Example 4: Dynamic Pressure Distribution Mapping

Figure 9:
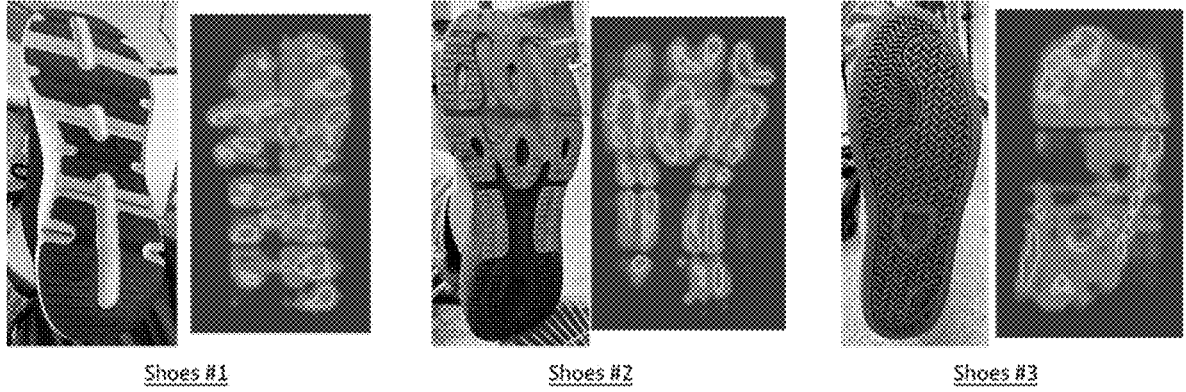
FIG. 9 shows a graphical pressure distribution mapping with 2-D image output at a condition of higher pressure on the mat.

FIG. 9 shows a pressure distribution mapping 2-D image out-put of the pressure sensing mat under a higher pressure condition. When people with different weights wear different shoes to stand on the pressure-sensing mat, a clear 2-D pressure distribution color image is output; this image can be recorded over time to create a pattern of pressure distribution during walking, running, standing, and jumping in order to analyze gait, foot structure defects, and injuries in order to take corrective orthopedic measures since the image clearly reflects the contact caused by the foot structure of the wearer of the shoe. It can further be used for product development of insole and shoe sole.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

As used herein and not otherwise defined, the terms "substantially," "substantial," "approximately" and "about" are used to describe and account for small variations. When used in conjunction with an event or circumstance, the terms can encompass instances in which the event or circumstance occurs precisely as well as instances in which the event or circumstance occurs to a close approximation. For example, when used in conjunction with a numerical value, the terms can encompass a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

As used herein, the singular terms "a," "an," and "the" may include plural referents unless the context clearly dictates otherwise. In the description of some embodiments, a component provided "on" or "over" another component can encompass cases where the former component is directly on (e.g., in physical contact with) the latter component, as well as cases where one or more intervening components are located between the former component and the latter component.

While the present disclosure has been described and illustrated with reference to specific embodiments thereof, these descriptions and illustrations are not limiting. It should be understood by those skilled in the art that various changes may be made, and equivalents may be substituted without departing from the true spirit and scope of the present disclosure as defined by the appended claims. The illustrations may not necessarily be drawn to scale. There may be distinctions between the artistic renditions in the present disclosure and the actual apparatus due to manufacturing processes and tolerances. There may be other embodiments of the present disclosure which are not specifically illustrated. The specification and the drawings are to be regarded as illustrative rather than restrictive. Modifications may be made to adapt a particular situation, material, composition of matter, method, or process to the objective, spirit, and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations.

The invention claimed is:

1. A pressure distribution monitoring flexible planar mat system comprising:

a flexible planar mat including:

a first electrode layer;

a first composite piezoelectric-dielectric layer;

a second composite piezoelectric-dielectric layer facing the first composite piezoelectric-dielectric layer;

a second electrode layer positioned beneath the second composite piezoelectric-dielectric layer;

wherein the first and second composite piezoelectric-dielectric layers include:

an elastomeric matrix having a first set of conductive particles embedded therein, the first set of conductive particles selected from one or more of carbon nanotubes, graphite particles, carbon fibers, carbon spheres, activated carbon, acetylene black, semiconductors, metals, or graphene in an amount of 2 to 10 wt. %;

dielectric particles selected from one or more of silica, zirconium oxide, alumina, boron nitride, aluminum nitride, silicon nitride, zinc oxide, silicon carbide, titanium dioxide, or calcium carbonate in an amount of 1 to 5 wt. %;

wherein the relative size of the particles in the first set of conductive particles and the dielectric particles is configured such that an interface between the first and second composite piezoelectric-dielectric layers and the first and second electrode layers has a micro-rough surface such that low pressure loads of 50 kPa or less generate a contact area of 0-10 percent of a layer surface area and high pressure loads of 50-3000 kPa generate a contact area of at least 10-100 percent of a layer surface area such that a total pressure detection range of the pressure distribution monitoring ultrathin flexible planar mat system is 0-3000 kPa;

a data collector collecting a pressure signal from the flexible planar mat;

a pressure distribution data processor for receiving and calculating data from the data collector and creating a two-dimensional pressure map from the flexible planar mat.

2. The pressure distribution monitoring flexible planar mat system of claim 1, wherein the first and second electrode layers are each formed on a flexible substrate having a thickness of 50-100 micron.

3. The pressure distribution monitoring flexible planar mat system of claim 2, wherein the flexible substrate is selected from polyethylene terephthalate or polyimide.

4. The pressure distribution monitoring flexible planar mat system of claim 2, wherein the first and second electrode layers include screen printed lines including electrode conductive particles.

5. The pressure distribution monitoring flexible planar mat system of claim 4, wherein the electrode conductive particles are selected from one or more of silver, copper, or aluminum.

6. The pressure distribution monitoring flexible planar mat system of claim 1, wherein the data collector includes an electrical resistance meter for measuring and recording electrical resistance of each pressure sensor in the mat under different pressure, a signal amplifier, an analog-to-digital converter and a data transmitter.

7. The pressure distribution monitoring flexible planar mat system of claim 1, wherein the pressure distribution data processor provides a two-dimensional pressure distribution pattern of a static or dynamic applied pressure.

8. The pressure distribution monitoring flexible planar mat system of claim 1, wherein the composite piezoelectric-dielectric layers include a second set of embedded conductive particles, different from the first set of conductive particles.

9. The pressure distribution monitoring flexible planar mat system of claim 8, wherein the second set of embedded conductive particles is selected from one or more of carbon nanotubes, graphite particles, carbon fibers, carbon spheres, activated carbon, acetylene black, semiconductors, metals, or graphene.

10. The pressure distribution monitoring flexible planar mat system of claim 1, wherein the materials of the elastomeric matrix include nitrile-based rubbers, silicone-based polymers, butyl-based rubbers, polyurethane elastomers bromobutyl rubber, chlorobutyl rubber, polyurethane, natural rubber, polyisoprene rubber, polybutadiene rubber, ethylene-propylene rubber, polysulfide, ethylene-propylene-diene rubber, poly(styrene-co-butadiene) rubber, poly(isoprene-co-butadiene) rubber, styrene-isoprene-butadiene rubber, or a combination thereof.

11. A printable flexible planar pressure sensing mat comprising:

a printable first electrode layer;

a printable first composite piezoelectric-dielectric layer;

a printable second composite piezoelectric-dielectric layer facing the printable first composite piezoelectric-dielectric layer;

a printable second electrode layer positioned beneath the printable second composite piezoelectric-dielectric layer;

wherein the printable first and second composite piezoelectric-dielectric layers include:

the flexible planar mat having a total thickness less than 0.30 mm;

an elastomeric matrix having a first set of conductive particles embedded therein, the conductive particles selected from one or more of carbon nanotubes, graphite particles, carbon fibers, carbon spheres, activated carbon, acetylene black, semiconductors, metals, or graphene in an amount of 2 to 10 wt. % and a particle size of 0.5-1 micron;

dielectric particles selected from one or more of silica, zirconium oxide, alumina, boron nitride, aluminum nitride, silicon nitride, zinc oxide, silicon carbide, titanium dioxide, or calcium carbonate in an amount of 1 to 5 wt. %;

wherein the relative size of the conductive particles and the dielectric particles is configured such that an interface between the printable first and second composite piezoelectric-dielectric layers and the printable first and second electrode layers has a micro-rough surface such that low pressure loads of 50 kPa or less generate a contact area of 0-10 percent of a layer surface area and high pressure loads of 50-3000 kPa generate a contact area of at least 10-100 percent of a layer surface area such that a total pressure detection range of the pressure distribution monitoring flexible planar mat system is 0-3000 kPa.

12. The printable flexible planar pressure sensing mat of claim 11, wherein the printable first and second electrode layers are each formed on a flexible substrate having a thickness of 50-100 micron.

13. The printable flexible planar pressure sensing mat of claim 12, wherein the flexible substrate is selected from polyethylene terephthalate or polyimide.

14. The printable flexible planar pressure sensing mat of claim 11, wherein the printable first and second electrode layers include screen printed lines including electrode conductive particles.

15. The printable flexible planar pressure sensing mat of claim 14, wherein the electrode conductive particles are selected from one or more of silver, copper, or aluminum.

16. The printable flexible planar pressure sensing mat of claim 11, wherein the printable first and second composite piezoelectric-dielectric layers include a second set of conductive particles, different from the first set of conductive particles.

17. The printable flexible planar pressure sensing mat of claim 16, wherein the second set of conductive particles is selected from selected from one or more of carbon nanotubes, graphite particles, carbon fibers, carbon spheres, activated carbon, acetylene black, semiconductors, metals, or graphene.

18. The printable flexible planar pressure sensing mat of claim 11, wherein the materials of the elastomeric matrix include nitrile-based rubbers, silicone-based polymers, butyl-based rubbers, polyurethane elastomers bromobutyl rubber, chlorobutyl rubber, polyurethane, natural rubber, polyisoprene rubber, polybutadiene rubber, ethylene-propylene rubber, polysulfide, ethylene-propylene-diene rubber, poly(styrene-co-butadiene) rubber, poly(isoprene-co-butadiene) rubber, styrene-isoprene-butadiene rubber, or a combination thereof.

\* \* \* \* \*